United States Patent [19]

Stamper et al.

[11] Patent Number: 4,666,761

[45] Date of Patent: May 19, 1987

[54] ROOFING MEMBRANE

[75] Inventors: Richard W. Stamper, Lambertville, Mich.; Robert C. Hultz, Toledo, Ohio

[73] Assignee: GenCorp Inc., Akron, Ohio

[21] Appl. No.: 880,444

[22] Filed: Jun. 30, 1986

[51] Int. Cl.$^4$ .................................................. B32B 7/02
[52] U.S. Cl. ................................. 428/215; 428/247; 428/283; 428/290; 428/483
[58] Field of Search ............ 427/36 D; 428/290, 483, 428/500, 215, 247, 283

[56] References Cited

U.S. PATENT DOCUMENTS

| | | | |
|---|---|---|---|
| 3,006,889 | 10/1961 | Frey | 525/239 |
| 3,209,055 | 9/1965 | Hedberg et al. | 525/239 |
| 3,459,591 | 8/1969 | Konishi et al. | 525/239 |
| 3,597,372 | 8/1971 | Cook | 525/239 |
| 4,041,197 | 8/1977 | Gagné | 427/366 |
| 4,180,531 | 12/1979 | Alia | 525/214 |
| 4,185,133 | 1/1980 | Woerner et al. | 427/366 |
| 4,356,284 | 10/1982 | Kohyak et al. | 428/290 |
| 4,556,694 | 12/1985 | Wallace | 525/239 |

*Primary Examiner*—Allan M. Lieberman

[57] ABSTRACT

Thermoplastic chlorosulfonated polyethylene fluxed with a minor amount of a plasticized and stabilized vinyl chloride polymer can be calendered with a reinforcing fabric on a standard PVC calender to provide a fabric coated on both sides with the fluxed chlorosulfonated polyethylene-PVC composition to provide a laminate useful as a roofing membrane.

2 Claims, No Drawings

ROOFING MEMBRANE

This invention relates to roofing membranes.

An object of this invention is to provide a roofing membrane.

This and other objects and advantages of the present invention will become more apparent to those skilled in the art from the following detailed description and example.

SUMMARY OF THE INVENTION

It has been found that thermoplastic chlorosulfonated polyethylene can readily be calendered on both sides of a reinforcing fabric layer using a standard vinyl calender at temperatures of from about 270° F. to 320° F. to form smooth coatings which exhibit good heat sealing properties, color stability and durability where the chlorosulfonated polyethylene contains a minor amount by weight of a plasticized and stabilized vinyl chloride polymer as a fluxing or alloying agent for the thermoplastic chlorosulfonated polyethylene. Thermoplastic chlorosulfonated polyethylene is "nervy" and has too much rubber-like toughness to process well on a standard vinyl calender. Even when a plasticizer and a stabilizer were added to the thermoplastic chlorosulfonated polyethylene in attempts to soften the chlorosulfonated polyethylene to allow higher processing temperatures and to improve flow, the resulting compounded thermoplastic chlorosulfonated polyethylene did not process satisfactorily on a standard vinyl calender.

DISCUSSION OF DETAILS AND PREFERRED EMBODIMENTS

Thermoplastic chlorosulfonated polyethylenes are known. Please see "Encyclopedia Of Polymer Science And Technology," Vol. 6, 1967, John Wiley and Sons, Inc., New York, pages 442–448.

The vinylchloride polymer or resin used can be homopolyvinylchloride, vinylchloride-vinyl acetate copolymer containing up to about 50% by weight of vinyl acetate and vinylchloride-vinylidene chloride copolymer containing up to about 50% by weight of vinylidene chloride and mixtures of the same, porous or non-porous. These polymers can be made by emulsion or suspension polymerization processes. These polymers should be in the form of finely divided particles or solids. The preferred vinylchloride resin to use is homopoly(vinylchloride).

Examples of plasticizers for the vinyl chloride polymers are the adipates like dibutyl adipate, di-(2-ethyl hexyl)adipate, dicapryl adipate, polyester adipates and so forth; the azealates like di-(2-ethylhexyl) azealate, dibutoxyethyl azealate and so forth; the benzoates like diethylene glycol dibenzoate, dipropylene glycol dibenzoate; the epoxy derivatives like epoxidized soy bean oil; the glutarates like diisodecyl glutarate, polyester glutarates and so forth; the phosphates like tri-(2-ethyl hexyl)phosphate, tri cresyl phosphate and so forth; the phthalates like dibutyl phthalate, diisononyl phthalate, dioctyl phthalate, di-(2-ethyl hexyl)phthalate, diisodecyl phthalate, didecyl phthalate, hexyl decyl phthalate (preferred) and so forth; polymeric polyesters; the sebacates like dibutyl sebacate, dioctyl sebacate and the like and mixtures thereof. The plasticizer is used in an amount required to get the desired flexibility and lowered Tg or softness on gelling or fusing of the vinyl chloride polymer. In general, the plasticizer can be used on a dry parts by weight basis in an amount equal to or up to about twice as much as the weight of the vinyl chloride polymer which includes antioxidants and UV absorbers.

Stabilizers which include antioxidants and UV absorbers for the vinyl chloride polymers can be any one of the benzophenones, octadecyl-3,5-di-tert-butyl-4 hydroxyhydrocinnamate, benzotriazoles, barium-cadmium compounds, barium-cadmium-zinc compounds, barium-zinc compounds, cadmium-zinc compounds, epoxides, lead compounds like dibasic lead phthalate, phosphites, tin compounds and so forth and mixtures of the same.

The vinyl chloride polymer containing plasticizer and stabilizer is used in an amount of from about 20 to 65 parts by weight per 100 parts by weight of the chlorosulfonated polyethylene.

Compounding ingredients which can be incorporated in the composition are magnesium oxide, the silicas such as precipitated silica, fumed colloidal silica, calcium silicate and the like, iron oxide, calcium carbonate, $TiO_2$, mold release agents like carbowax, mildewcides, barytes, methylmethacrylate polymers and so forth. These compounding ingredients are used in effective amounts by weight to control color, stabilization, viscosity and so forth.

For more information on vinyl chloride polymers and copolymers (resins), plastisols, plasticizers, compounding ingredients and so forth, please see Schildknecht, "Vinyl and Related Polymers," John Wiley & Sons, Inc., New York, 1952; Sarvetnick, "Polyvinyl Chloride," Van Nostrand Reinhold Company, New York, and "Modern Plastics Encyclopedia 1980-1981," October 1980, Volume 57, No. 10A, McGraw-Hill Inc., New York.

The fabric used as the reinforcing intermediate layer can be woven or non woven. The fabric can be of open or closed weave. The fibers, yarns or cords of the fabric can be natural or synthetic organic fibers or mixture thereof. Additionally, the yarns may vary from one type to another type. Examples of such yarns are those from silk, cotton, wool, hair, nylon, aramid, acrylics ("Acrilan"), polyester (preferred), polyvinylchloride, vinyl chloride-vinyl acetate copolymers, polyurethanes, rayon, polyacrylonitriles, vinyl chloride or vinylidene chloride copolymerized with acrylonitrile, polyvinylidene chloride, polypropylene fibers and the like. Glass fibers may be blended or woven with the natural and/or synthetic organic fibers. These fibers or yarns can contain fire retardants, antistatic agents, bacteriostats, antidegradants, dyes, pigments, optical brighteners and so forth.

In preparing the roofing membrane all of the ingredients are mixed together in a ribbon blender and then in a Banbury mixer at a temperature of from about 250° F. to 300° F. to flux the composition which is next sheeted out on a plastic mill. The resulting composition is then passed through a standard 4-roll polyvinyl calender with the reinforcing fabric layer at a temperature of from about 270° F. to 320° F. to coat or laminate a coating on each side of the fabric to provide a coating of from about 10 to 30 mils thick on each side of the fabric.

The following example will serve to illustrate the present invention with more particularity to those skilled in the art. In the example, the parts are parts by weight unless otherwise indicated.

EXAMPLE

| Material | Parts By Weight | | |
|---|---|---|---|
| | Run A | Run B | Run C |
| HYPALON 45 (1) | 50 | 50.0 | 50.0 |
| PVC (2) | 2.5 | 5. | 10. |
| Hexyl decyl phthalate | 10 | 10 | 20. |
| Ba—Cd—Zn stabilizer | 2.0 | 2.0 | 2.0 |
| VINYEZENE BP-5 (3) | 2.0 | 2.0 | 2.0 |
| Polymethylmethacrylate | 2.0 | 2.0 | 2.0 |
| MgO | 2.5 | 2.5 | 2.5 |
| EPON 828 (4) | 3.0 | 3.0 | 3.0 |
| IRGANOX 1076 (5) | .7 | .7 | .7 |
| CARBOWAX (6) | 1.0 | 1.0 | 1.0 |
| KENAMID 5 (7) | .4 | .4 | .4 |
| CaCO$_3$ | 50. | 50.0 | 50.0 |
| TiO$_2$ | 15. | 15.0 | 15. |

The above composition was fluxed in a Banbury mixer at the above temperatures and sheeted out on a plastic mill. It was then calendered on a standard 4-roll vinyl calender at the above temperatures with a reinforcing fabric which was a 9×9 thread count 1000 denier polyester scrim fabric to provide a coating on each side of the fabric of about 10 to 30 mils.

Run A provided a smooth bank on the mill less tack and a small rolling bank.

Run B provided a smoother sheet on the mill than Run A with less tack. It was dry and gave a small rolling band and spread easily.

Run C provided a very smooth sheet on the mill with a medium rolling bank. It was creamy.

Notes:

(1) Chlorosulfonated polyethylene 24% chlorine, 1.0% sulfur, Sp. gr. 1.08, Mooney Viscosity ML 1+4 at 212° F. of 37. Thermoplastic. du Pont (2) Porous, suspension polymerized, homopolyvinyl chloride having an inherent viscosity in cyclohexanone of 0.77 at 30° C.

(3) Mildewcide (4) Diglycidylether of Bisphenol A, having an epoxy equivalent of 185-192, a viscosity in centipoises at 25° C. of 10,000-16,000, liquid resin having an IR spectra No. of 4-1-10. Shell Chemical Co.

(5) Octadecyl-3,5-di-tert-butyl-4-hydroxyhydrocinnamate. Ciba-Geigy.

(6) Polyethylene glycol. Union Carbide.

(7) Stearamide. Hunko Chemical.

We claim:

1. A roofing membrane having an intermediate reinforcing fabric layer and an adherent coating on each side of said layer, each of said coatings comprising an unvulcanized compounded composition containing a thermoplastic chlorosulfonated polyethylene and as an alloying or fluxing agent for said chlorosulfonated polyethylene from about 20 to 65 parts by weight per 100 parts by weight of said chlorosulfonated polyethylene of a plasticized and stabilized vinyl chloride polymer, said composition being free of curing agents and having been prepared by fluxing said chlorosulfonated polyethylene, vinylchloride polymer, plasticizer and stabilizer and compounding ingredients at a temperature of from about 250° F. to 300° F. and said composition having been calendered on each side of said fabric layer to form coatings on said fabric layer at a temperature of from about 270° F. to 320° F., said vinyl chloride polymer being selected from the group consisting of homopolyvinylchloride, vinylchloride-vinyl acetate copolymer containing up to about 50% by weight of vinyl acetate and vinylchloride-vinylidene chloride copolymer containing up to about 50% by weight of vinylidene chloride and mixtures of the same which are porous or nonporous and which are in the form of finely divided particles or solids.

2. A roofing membrane according to claim 1 where said fabric is a polyester scrim fabric; where said chlorosulfonated polyethylene contains about 24% chlorine and 1% sulfur, has a specific gravity of 1.08 and has a Mooney viscosity ML 1+4 at 100° C. of 37; where said vinyl chloride polymer is a suspension polymerized homopolyvinyl chloride, is porous and has an inherent viscosity of 0.77 in cyclohexanone at 30° C. and where each coating is from about 10 to 30 mils thick.

* * * * *